Patented Jan. 17, 1933

1,894,566

UNITED STATES PATENT OFFICE

GEORGE JAMES MANSON, OF HAWKESBURY, ONTARIO, CANADA, ASSIGNOR, BY MESNE ASSIGNMENTS, TO MANSON CHEMICAL COMPANY, OF MONTCLAIR, NEW JERSEY, A CORPORATION OF NEW JERSEY

METHOD OF WATERPROOFING PAPER

No Drawing. Original application filed July 8, 1926, Serial No. 121,260. Divided and this application filed April 25, 1927. Serial No. 186,600.

This invention relates to an improved method of waterproofing paper by means of the distribution therethrough of a water repellant substance such as wax, and the objects of the invention are to provide simple and effective means for distributing the water repellant substance through the material in which it is to be used. I have found that if a water repellant such as wax is, during a process of emulsification, coated with a finely divided precipitate as described in my co-pending application Serial No. 121,260, filed July 8th 1926, and of which the present application is a division, then such water repellant substance will form an effective water-proofing medium for paper if introduced into the paper stock as hereinafter described.

It is desirable in the formation of emulsions that the emulsifying medium, or the medium which is relied upon to facilitate dispersion of the wax or other water repellant substance should be in as finely divided a state as possible in order to facilitate the coating of the minute particles of the wax or the like with the said substance. I have found that if the emulsifying medium, instead of being a pre-formed material such as finely divided clay, is produced by precipitation during the process of emulsification or dispersion, then a much greater degree of fineness may be produced with corresponding improvement in the final product.

Such a precipitate may be formed from a variety of electrolytes or combinations of electrolytes by reaction therewith of other suitable electrolytes to form a finely divided precipitate, the dispersion of the water repellant substance being caused to take place simultaneously with the emulsification.

The invention is applicable to a variety of water repellant substances which may be selected according to the use to which they are to be applied. Such water repellant substance may, for instance, be any natural or synthetic oil, fat, resin, bitumen or wax, or any other suitable combination of these. Convenient materials to use are resin, pitch, tar or wax.

With certain of the water repellant substances it may be found advisable to add a small quantity of any well known emulsifying agent.

I have found that electrolytes such as magnesium chloride, magnesium sulphate, aluminum sulphate, sodium chloride, hydrochloric acid, sulphuric acid, organic or inorganic acids used separately or together with such electrolytes as sodium hydroxide, calcium hydroxide, ammonia, and sodium carbonate give a suitable encysting precipitate.

In practicing the method the wax or other water repellant material is melted and mixed with water containing in solution one or more of the above mentioned electrolytes. An electrolyte or electrolytes which will give a precipitate with the first electrolyte is then added and the mixture stirred while the precipitate is being formed, the temperature being maintained above the melting point of the wax or other water repellant substance, whereby the encysting precipitate will form a coating about the individual particles of wax or other water repellant substance to maintain them in discrete form and prevent them from coalescing when the mixture cools.

The following will serve as examples of practically carrying out the process:

*Example I.*—150 pounds of Montan wax are melted; into this is poured 150 pounds of water containing in solution 9 pounds of sodium carbonate, the solution of the sodium carbonate having a temperature of about 10° above the melting point of Montan wax; the melted Montan wax and solution of sodium carbonate is then rapidly stirred and a solution of 14 pounds of magnesium chloride dissolved in 75 pounds of water is added, whereby a finely divided precipitate of magnesium carbonate is formed which coats the particles of Montan wax and maintains them in discrete form, preventing them from fusing together when the mixture cools.

*Example II.*—19% of Montan wax; 18% of paraffin wax; 1.7% of unslacked lime —plus— (65% of the total water) ; 4.6% of alum, —plus— (35% of the total water).

The melted wax is put in the mixer and the milk of lime added. After 1 minute agitation the alum solution is added and agitated for two minutes when it is dumped. Working temperature 170° F.

It will be found that this dispersion mixture can be indefinitely diluted with water to any desirable stage of dilution appropriate to the purpose in hand. Alum, for instance, may be added to complete any coagulating effect required. Owing to the peculiar modifying qualities of the encasing or encysting mineral precipitate on the wax particle (which may be attributed to the method of forming the wax dispersion) so great a proportion of alum as is customarily employed with, for example, resin size, need not be used in the practice of the preferred form of the present invention.

As many changes could be made in the above construction and many apparently widely different embodiments of my invention, within the scope of the claims, constructed without departing from the spirit or scope thereof, it is intended that all matter contained in the accompanying specification shall be interpreted as illustrative and not in a limiting sense.

In companion application, Serial No. 186,602, filed April 25, 1927, entitled Waterproofed fibrous products, there is described and claimed the fibrous products incorporated with the water-repellant substances, and dispersions containing such water-repellant substances produced by the methods set forth in the instant application.

What I claim as my invention is:

1. The method of waterproofing paper which comprises encasing a water-repellant substance with a precipitate formed by double decomposition while dispersing said water-repellant substance, and introducing said dispersion mixture into stock from which paper is to be formed.

2. The method as claimed in claim 1 wherein the dispersion mixture is coagulated in the paper stock.

3. The method of waterproofing paper which comprises forming a dispersion of a pre-encysted water-repellant substance in the presence of an emulsifying agent, and introducing said dispersion mixture into stock from which paper is to be formed.

4. The method of water-proofing paper which comprises introducing into stock from which paper is to be formed, a dispersion of a water-repellant substance encased with a precipitate formed by double decomposition during the dispersion of the water-repellant substance.

5. The method as claimed in claim 4 wherein the dispersion mixture is coagulated in the paper stock.

6. The method of water-proofing paper which comprises introducing into stock from which paper is to be formed, a dispersion of pre-encysted water-repellant substance formed in the presence of an emulsifying agent.

7. The method of preparing waterproof paper products which comprises agitating an aqueous solution of an electrolyte with a water-repellant substance to break up the water-repellant substance into finely divided particles carried in said aqueous solution, adding a second electrolyte reactive with the first electrolyte to form a precipitate upon the particles of the finely divided water-repellant substance, whereby the particles of finely divided water-repellant substance become encysted in the precipitate and dispersed in the aqueous medium, and incorporating said dispersion with paper stock.

8. The method of making waterproof paper products which comprises agitating an aqueous solution of an electrolyte with a wax to break up the wax into finely divided particles carried in said aqueous solution, adding a second electrolyte reactive with the first electrolyte to form a precipitate upon the particles of the finely divided wax, whereby the particles of finely divided wax become encysted in the precipitate and dispersed in the aqueous medium, and incorporating said dispersion with paper stock.

9. The method of making waterproof paper products which comprises agitating an aqueous solution of an electrolyte with a water-repellant substance to break up the water-repellant substance into finely divided particles carried in said aqueous solution, adding a second electrolyte reactive with the first electrolyte to form a precipitate upon the particles of the finely divided water-repellant substance, whereby the particles of finely divided water-repellant substance become encysted in the precipitate and dispersed in the aqueous medium, incorporating said dispersion with paper stock, and coagulating said dispersion in the paper stock after said incorporation.

10. The method of preparing waterproof paper products which comprises simultaneously dispersing a water-repellant substance in an aqueous medium while encysting the dispersed particles of the water-repellant substance, and incorporating said dispersion with paper stock.

In witness whereof I have hereunto set my hand.

GEORGE JAMES MANSON.